3,080,352
AMORPHOUS POLY(VINYL LOWER-ALKYL ETHERS) AND METHOD OF PREPARING
Leon Fishbein, New City, N.Y., and Frank A. Magnotta, Lancaster, Pa., assignors to Air Reduction Company, Incorporated, New York, N.Y., a corporation of New York
No Drawing. Filed July 13, 1960, Ser. No. 42,519
4 Claims. (Cl. 260—91.1)

This invention relates to polymers of vinyl lower alkyl ethers and to a process for producing them and is more particularly concerned with poly(vinyl lower-alkyl ethers) which have high intrinsic viscosities and other valuable properties, and to a process for making them.

The polymerization of vinyl alkyl ethers has been heretofore proposed and various processes have been described. Typical processes have, for example, been disclosed in U.S. Patents Nos. 2,104,000 and 2,104,002, wherein polymerization is effected in the presence of acid-reacting catalysts at various temperatures. The products obtained by these prior processes are for the most part brown, viscous, liquid or soft-solid products, generally described as "balsam-like." In any case, they are of relatively low molecular weight and of low intrinsic viscosity. Efforts to produce more valuable products have continued and products have been described which have a higher molecular weight and are further removed from the liquid or soft-solid state. These improved products, however, have only moderately good physical properties and their molecular weights are far below those which are obtained in the polymerization of other types of monomers, such as styrene.

There has, accordingly, been a continuing search for vinyl alkyl polymers of truly high molecular weight and particularly for polymers which exhibit valuable related properties such as high intrinsic viscosity. Varying success has been had with vinyl alkyl ethers but particular difficulty has been experienced with vinyl isopropyl ether. Various catalysts and reaction media have been proposed but heretofore used procedures have not effectively produced polymers of high intrinsic viscosity, particularly in the case of vinyl isopropyl ether. Furthermore, very low temperatures e.g. $-78°$ C. have generally been necessary for controlled polymerization initiated by prior catalysts, and attempts to operate at temperatures in the vicinity of $0°$ C. have been difficult to control.

It is an object of the present invention to provide new polymers of vinyl lower alkyl ether which have high intrinsic viscosities and valuable physical properties, more particularly vinyl isopropyl ether polymers which have these characteristics.

It is another object of the invention to provide a process for producing vinyl lower alkyl ether polymers of the character indicated which is particularly suitable for the polymerization of vinyl isopropyl ether.

It is a further object of the invention to provide a new catalyst system for polymerizing vinyl lower alkyl ethers which is of particular utility in forming polymers of high intrinsic viscosity, particularly from vinyl isopropyl ether.

The high intrinsic viscosity polymers of this invention are suitably prepared by polymerizing a vinyl lower alkyl ether, such as vinyl methyl ether, vinyl ethyl ether, vinyl propyl ether, vinyl isopropyl ether, vinyl butyl ether, and vinyl isobutyl ether, at temperatures between $-40°$ C. and $0°$ C., preferably at temperatures of $0$–$35°$ C., using a catalyst system composed of a boron trifluoride ether complex or "adduct," and a mixture of aliphatic hydrocarbons, viz. a mixture of propane, and butane or pentane.

While the boron trifluoride-diethyl ether complex is preferably used, other boron trifluoride complexes may be used, such as boron trifluoride-dimethyl ether, boron trifluoride-methylethyl ether, boron trifluoride-methylpropyl ether, boron trifluoride-ethylisopropyl ether, boron trifluoride-dipropyl ether, and the like.

To effect polymerization, the monomer, e.g. vinyl isopropyl ether, is mixed with the propane and the butane or pentane and then the boron trifluoride etherate is added, preferably in small increments. Within a few minutes after the addition of the etherate, polymerization starts, as evidenced by rapid evolution of heat and the reaction is generally complete within a period of ½ to 3 hours. Completion of the reaction is evidenced by high viscosity of the reaction mixture or by lack of heat evolution.

The reaction is suitably carried out at reflux and the temperature thus generally corresponds to the boiling point of the hydrocarbon mixture employed. The entire reaction is readily carried out at atmospheric pressure, and there is no need to employ super-atmospheric or sub-atmospheric pressures, although such pressures may be used if desired.

The polymerization mixture to which the boron trifluoride etherate is added suitably contains 5 to 25 volume percent of the monomeric vinyl alkyl ether and 75 to 95 volume percent of the hydrocarbon mixture. The quantity of catalyst is advantageously 0.01% to 0.1%, preferably about 0.05%, by weight of the vinyl alkyl ether monomer. The boron trifluoride etherate may be added directly to the polymerization mixture or it may be first dissolved in a solvent, e.g. chloroform, e.g. to form a 2 to 5% solution. Expressed in terms of volume, the amount of boron trifluoride etherate is 0.5% to 1.5% by volume of the monomer.

The ratio of propane to its co-hydrocarbon, i.e. butane or pentane may vary but it is suitably in the volume ratio of about 1:3 to about 2:1, preferably about 1:1.

Commercial vinyl alkyl ethers are commonly produced by the reaction of acetylene upon the appropriate alcohol and commercial vinyl methyl ether, for example, normally contains a total of about 5% of contaminants consisting of methanol, water, acetaldehyde, acetylene, and possibly dimethyl acetal. One of the important advantages of the catalyst system of this invention is its ability to form valuable high intrinsic viscosity polymers from commercial monomers. Thus, commercial monomer can be polymerized with the novel catalyst system without preliminary purification, although it is generally desirable first to wash the monomer thoroughly with water to remove the methanol or other alcohol, followed by drying over KOH and recovery of the monomer by distillation. If, however, it is desired to reduce to a minimum the various contaminants present, this can be done by refluxing the commercial monomer over solid potassium hydroxide, e.g. at $6°$ C., for about 16 hours, followed by refluxing over metallic sodium for about 16 hours. The ether is separated from the potassium by simple distillation and, following the treatment over metallic sodium, the ether is distilled through a fractionating column until the distillate gives a negative test for acetylene (Ilosvay's reagent) and acetaldehyde (Tollen's reagent). A higher intrinsic viscosity is obtained from a given monomer if it is purified before being subjected to polymerization and if the mixed hydrocarbons are relatively pure.

The polymerization reaction is conveniently carried out in any conventional apparatus used for this type of reaction. When operating on a small scale, for example, a particularly suitable reaction vessel is a three-necked flask fitted with a "Dry-Ice" condenser and suitably provided with a thermometer. Corresponding large-scale units are readily employed when desired and the process of the invention is in no way limited by a particular reaction apparatus.

Upon completion of polymerization, the catalyst is deactivated or "quenched" prior to separation of the polymer. The quenching of acid-reacting catalysts is a well-known procedure and is suitably effected by treating the polymerization mass with a mixture of a lower alkyl alcohol, e.g. methanol, a lower alkyl hydrocarbon, e.g. pentane, and ammonium hydroxide, containing a small amount, e.g. 1%, of 2,6-di-tert-butyl-4-methylphenol, or other like known oxidation inhibitor. Instead of ammonium hydroxide, other alkaline reagents such as sodium hydroxide, potassium hydroxide or organic amines such as methylamine, ethanolamine, pyridine, and the like may be used, and instead of methanol, other alcohols such as ethanol and butanol, and the like may be employed. Similarly, instead of pentane other hydrocarbons such as hexane and the like may be used. Preferably the volume of hydrocarbon is 3 to 5 times the volume of alcohol and sufficient alkaline agent is used to react with all of the catalyst. For each volume of the boron fluoride etherate introduced into the polymerization mass there are advantageously employed .05 to 1 volume of the quenching mixture.

After deactivation or "quenching" of the catalyst, the polymer is recovered merely by evaporation of the alkaline solvent. The polymer is then dried, preferably under vacuum, in a low temperature oven, e.g. at 30 to 50° C. to constant weight.

The polymers produced in accordance with this invention are characterized by an intrinsic viscosity of at least 1.4 deciliters per gram (dl./gm.), preferably 2 to 6 dl./gm. Intrinsic viscosity is suitably determined by conventional techniques in accordance with the procedure described on pages 309–314 of "Principles of Polymer Chemistry," by Paul J. Flory (Cornell University Press, 1953), using an Ubbelohde (suspended level) viscometer for methy ethyl ketone solutions at 30° C.

It has been found that the relationship which exists between intrinsic viscosity and molecular weight may be expressed by the following formula: $[\eta]=1.1\times10^{-3}M^{0.56}$, wherein $[\eta]$ is the intrinsic viscosity in deciliters per gram and $M$ is the molecular weight. It is possible by means of this formula to determine molecular weight with accuracy once the intrinsic viscosity value is known. Molecular weight can also be determined by the well-known light-scattering method described on pages 283–303 of the above-mentioned "Principles of Polymer Chemistry."

The poly(vinyl alkyl polymers) particularly the polyvinyl isopropyl ethers, obtainable in accordance with the above-described process, are novel compositions of matter which are generally amorphous in character and are characterized not only by high intrinsic viscosity and other valuable properties but they are also characterized by the fact that they are clear and colorless and have long-lasting stability to light and heat. They have improved form stability and they can be cross-linked by treatment with benzoyl peroxide, which has the effect of rendering the polymer thermo-setting. The polymers are generally soluble in organic solvents such as benzene, chlorobenzene, ether, octane, ethanol and with respect to water they are generally insoluble.

A particularly important and valuable use for the high-molecular weight polymers of this invention is as the fuel component of solid rocket propellants, wherein they are admixed with an oxidizer such as sodium nitrate, ammonium perchlorate, and like known solid propellant oxidizers. Thus, in a typical solid rocket propellant having a high specific impulse, e.g. a specific impulse of 240 pounds per second per pound, a high intrinsic viscosity polymer having the characteristics above described is combined with the oxidizer in the proportions of 20% by weight of polymer and 80% by weight of oxidizer.

In the foregoing, the term "lower alkyl" is used to mean an alkyl group containing 1 to 6 carbon atoms in accordance with customary practice and it will be understood that the invention is applicable to all lower alkyl vinyl ethers.

The following specific examples are further illustrative of the invention, it being understood that these examples are given by way of illustration only and are not to be considered as limitative of the invention.

Example 1

A 2-liter reactor kettle with attached thermometer, burette, stirrer and cold finger was purged with nitrogen. Fifty cc. (37.5 g) of vinyl isopropyl ether and 250 cc. of pentane were placed in the kettle. Propane (250 cc.) was then condensed in the kettle. The stirring and condensing of the propane gave an approximate temperature of −15° C. The catalyst (0.25 ml. of a 2% solution of $BF_3$ etherate in $CHCl_3$) was added to the flask from a burette. Stirring and refluxing were continued for about 20 minutes.

After this time, a slight heat of reaction was observed. As the monomer was used up, the temperature of the kettle contents dropped gradually to about −18° C. A decrease in temperature and the formation of a viscous mass are indications that the polymerization is over. After completion of the reaction, 3 ml. of methanol and 10 drops of $NH_4OH$ were added, followed with 0.375 g. of 2,6-di-t-butyl-4-methylphenol dissolved in 20 ml. of pentane. This polymer mixture was stirred without a condenser to effect venting of the propane. The yield of poly(isopropyl vinyl ether) was essentially quantitative and the polymer was non-tacky. Its intrinsic viscosity (in benzene) was found to be 5.5. When duplicate tests were carried out using 500 cc. of pentane instead of the 1:1 pentane-propane mixture, the polymers obtained were tacky and colorless with intrinsic viscosities of 0.2 and 0.28, respectively.

Example 2

A one-liter resin kettle fitted with a glass paddle stirrer, two Dry-Ice condensers (protected by $CaCl_2$ drying tubes) and a low temperature thermometer was immersed in a Dry-Ice-acetone bath and 50 ml. of butane followed by 100 ml. of propane were evaporated into the kettle. To this solvent system were added 3 drops of boron trifluoride ethyl ether catalyst. The Dry-Ice bath was removed, stirring was initiated and the mixture refluxed at −32° C. To the reaction mixture was quickly added in one portion 50 ml. (38.5 g.) of isobutyl vinyl ether (pre-cooled in a Dry-Ice bath).

The reaction temperature rose from −32° C. to −25° C. upon the addition of the monomer. Within 1–2 minutes after the addition of the monomer, a vigorous reaction ensued as evidenced by very rapid refluxing of the solvents followed by formation of polymer on the wall of the reaction kettle.

The reaction mixture was stirred for an additional 2½ hours after the onset of polymerization. A quenching mixture consisting of 3 ml. of methanol containing 5 drops of $NH_4OH$ followed by 5 ml. of pentane containing 0.40 g. of 2,6-di-t-butyl-4-methylphenol was then added and the reaction mixture was stirred for an additional ½ hour, after which the solvents were evaporated at room temperature.

The polymeric material was then transferred to a wide mouth jar and the remaining solvent stripped off in a vacuum oven at a temperature of 35° C. Poly(isobutyl vinyl ether) was thus produced in quantitative yield and the polymer had an intrinsic viscosity (in benzene) of 2.4 dl./g.

When the process was repeated, employing a solvent system of 150 ml. of propane/pentane (1:1) at about −20° C., a polymer having an intrinsic viscosity of 1.4 to 1.8 dl./g. was obtained. The use of n-butane as a solvent at 0° C. yielded polymer in quantitative yield having an intrinsic viscosity of 1.0 dl./g.

Example 3

A one-liter resin kettle fitted with a glass paddle stirrer, two Dry-Ice condensers (protected by $CaCl_2$ drying tubes) and a low temperature thermometer was immersed in a Dry Ice-acetone bath and 50 ml. of methyl vinyl ether, 100 ml. of n-butane and 100 ml. of propane successively evaporated into the kettle. The Dry-Ice bath was removed, stirring initiated, and the reaction mixture refluxed for 30 minutes at −25° C.

A total of 0.50 ml. of catalyst (2% boron fluoride ethyl ether in chloroform) was added in two 0.25 ml. portions over a 30 minute period. Within one hour after the final addition of catalyst, a mildly exothermic reaction ensued concurrent with separation of polymer on the wall of the resin kettle.

The reaction mixture was stirred for an additional four hours, after which it was quenched by the addition of gaseous ammonia followed by the addition of 5 ml. pentane containing 0.4 g. of 2,6-di-t-butyl-4-methylphenol. The reaction mixture was stirred for an additional ½ hour, after which the solvents were evaporated at room temperature.

The product poly(methyl vinyl ether) was then transferred to a wide mouth jar and the remaining solvent stripped off in a vacuum oven at a temperature of 35° C. The polymer was found to have an intrinsic viscosity (in benzene) of 1.4 dl./g.

Example 4

Into the apparatus described in Examples 2 and 3, there were charged 50 ml. of vinyl isopropyl ether and 250 ml. of pentane. The kettle was immersed in a Dry-Ice bath and 250 ml. of propane introduced. The Dry-Ice bath was removed, stirring initiated and the reaction mixture refluxed for 30 minutes at about −18° C.

A total of 0.50 ml. of catalyst (2% boron fluoride ethyl ether in chloroform) was added in two 0.25 ml. portions over a 30-minute period. Within several minutes after the final addition of catalyst, a vigorous reaction ensued with the reaction temperature rising about two to three degrees.

The reaction mixture was stirred for an additional 2 to 3 hours after the onset of polymerization. A quenching mixture consisting of 3 ml. of methanol containing 10 drops of ammonium hydroxide followed by 10 ml. of pentane containing 0.40 g. of 2,6-di-t-butyl-4-methylphenol was then added and the reaction mixture was stirred for an additional ½ hour, after which the solvents were evaporated away at room temperature.

The poly(isopropyl vinyl ether) was then transferred to a wide mouth jar and the remaining solvent stripped off in a vacuum oven at 35° C. This polymer had an intrinsic viscosity (in benzene) of 5.9 dl./g.

Example 5

A series of polymerizations of isopropyl vinyl ether were carried out using varying amounts of monomer, varying amounts of propane and pentane and varying amounts of catalyst. These operations were carried out in a 30 gal. stainless steel reactor equipped with a low speed stirrer (45 r.p.m.). The condenser attached to the reactor was cooled by circulating acetone at −70° C. through its jacket.

The procedure was as follows: Purified pentane and vinyl isopropyl ether were charged to the reactor and cooled to below 0° C. Propane was added while cooling the reactor until a reflux temperature of −17° C. was obtained. The catalyst was then added. An exothermic reaction occurred from 8 to 20 minutes after catalyst (boron fluoride ethyl ether) addition. The batch was stirred for an additional 2 to 3 hours after which it was neutralized (quenched) by adding gaseous ammonia and stabilized with an anti-oxidant (2,6-di-t-butyl-4-methylphenol). The propane was vented to the atmosphere and the batch then dropped into open drums. The pentane was evaporated away until a solution containing 50–60 weight percent of polymer was obtained. The pertinent data was tabulated below:

| Test No. | 1 | 2 | 3 | 4 |
|---|---|---|---|---|
| Pentane, lbs | 52 | 52 | 39 | 52 |
| Vinyl isopropyl ether, gms | 5,700 | 5,700 | 4,900 | 5,900 |
| Propane, lbs | 31 | 30 | 16 | 18 |
| Catalyst, ml | 75 | 75 | 50 | 75 |
| Reflux temperature, ° C | −22 | −22 | −20 | −18 |
| Intrinsic viscosity (benzene) | 4.4 | 4.4 | 4.7 | 4.4 |

It will thus be seen that, in accordance with the invention, lower alkyl vinyl ethers, particularly isopropyl vinyl ether, can be polymerized effectively and efficiently to form polymers of high intrinsic viscosities without requiring excessively low temperatures or complicated operating techniques.

It will be understood that various changes and modifications may be made without departing from the scope of the invention as defined in the appended claims and it is intended, therefore, that all matter contained in the foregoing description shall be interpreted as illustrative only and not as limitative of the invention.

We claim:

1. A process of making polymers of high intrinsic viscosity from a vinyl lower alkyl ether wherein the lower alkyl radical contains from 1 to 6 carbon atoms which comprises polymerizing said ether at a temperature of −40° C. to 0° C. in the presence of a catalyst consisting essentially of a boron trifluoride-ether complex in a solvent consisting essentially of a mixture of propane and a co-hydrocarbon selected from the group consisting of butane and pentane, the volume ratio of said propane and said co-hydrocarbon being in the range of about 2:1 to about 1:3.

2. A method for preparing polymers of high intrinsic viscosity from vinyl isopropyl ether comprising polymerizing said ether at a temperature of −40° C. to 0° C. in the presence of a catalyst consisting of a boron trifluoride-ether complex in a solvent consisting essentially of a mixture of propane and pentane, the volume ratio of propane and pentane being in the range of about 2:1 to about 1:3.

3. A method for preparing polymers of high intrinsic viscosity from vinyl isobutyl ether comprising polymerizing said ether at a temperature of −40° C. to 0° C. in the presence of a catalyst consisting of a boron trifluoride-ether complex in a solvent consisting essentially of a mixture of propane and butane, the volume ratio of propane and butane being in the range of about 2:1 to about 1:3.

4. A method for preparing polymers of high intrinsic viscosity from vinyl methyl ether comprising polymerizing said vinyl ether at a temperature of −40° C. to 0° C. in the presence of a catalyst consisting of a boron trifluoride-ether complex in a solvent consisting essentially of a mixture of propane and butane, the volume ratio of propane and butane being in the range of about 2:1 to about 1:3.

References Cited in the file of this patent

UNITED STATES PATENTS 2,555,179   Zoss ------------------ May 29, 1951
2,616,879   Zoss ------------------ Nov. 4, 1952

OTHER REFERENCES

Schildknecht et al.: Ind. and Eng. Chem. 41, No. 9, pp. 1998–2003; September 1949.